US010365907B2

(12) United States Patent
Antony et al.

(10) Patent No.: US 10,365,907 B2
(45) Date of Patent: *Jul. 30, 2019

(54) OFFLINE TOOLS INSTALLATION FOR VIRTUAL MACHINES

(71) Applicant: VMWARE, INC., Palo Alto, CA (US)

(72) Inventors: Jinto Antony, Bangalore (IN); Hariharan Jeyaraman Ganesan, Bangalore (IN); Madhusudhanan Gangadharan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/000,056

(22) Filed: Jan. 19, 2016

(65) Prior Publication Data

US 2017/0139697 A1 May 18, 2017

(30) Foreign Application Priority Data

Nov. 12, 2015 (IN) ............................ 6102/CHE/2015

(51) Int. Cl.
*G06F 9/455* (2018.01)
*G06F 8/60* (2018.01)
*G06F 8/61* (2018.01)
*G06F 8/65* (2018.01)

(52) U.S. Cl.
CPC ................. *G06F 8/61* (2013.01); *G06F 8/60* (2013.01); *G06F 8/63* (2013.01); *G06F 8/65* (2013.01); *G06F 9/455* (2013.01); *G06F 9/45533* (2013.01); *G06F 9/45558* (2013.01); *G06F 2009/4557* (2013.01); *G06F 2009/45562* (2013.01); *G06F 2009/45579* (2013.01); *G06F 2009/45583* (2013.01)

(58) Field of Classification Search
CPC .. G06F 9/455; G06F 9/45533; G06F 9/45558; G06F 8/60; G06F 8/61; G06F 8/63; G06F 8/65

See application file for complete search history.

(56) References Cited

U.S. PATENT DOCUMENTS

| | | | | |
|---|---|---|---|---|
| 7,823,145 | B1 * | 10/2010 | Le | G06F 8/65 709/203 |
| 2003/0188304 | A1 * | 10/2003 | Goodman | G06F 8/656 717/171 |
| 2008/0244577 | A1 * | 10/2008 | Le | G06F 8/63 718/1 |
| 2009/0089860 | A1 * | 4/2009 | Forrester | H04L 63/12 726/3 |

(Continued)

*Primary Examiner* — Charles M Swift
(74) *Attorney, Agent, or Firm* — Loza & Loza, LLP

(57) ABSTRACT

A method for managing tools on a virtual machine includes provisioning a virtual machine. The method also includes, before powering on the virtual machine, collecting a list of one or more tools on the virtual machine, and a version associated with each of the one or more tools. The method also includes determining if one or more new tools should be installed on the virtual machine. Responsive to determining if one or more new tools should be installed, the method includes retrieving a tool image for each new tool to be installed. The method further includes installing the one or more new tools on a virtual disk file of the provisioned virtual machine using the tool images.

18 Claims, 6 Drawing Sheets

(56) References Cited

U.S. PATENT DOCUMENTS

| | | | | |
|---|---|---|---|---|
| 2009/0113413 | A1* | 4/2009 | Reinz | G06F 19/3412 717/173 |
| 2009/0320014 | A1* | 12/2009 | Sudhakar | G06F 8/65 717/169 |
| 2010/0192143 | A1* | 7/2010 | Ingle | G06F 8/63 717/172 |
| 2011/0265076 | A1* | 10/2011 | Thorat | G06F 8/65 717/172 |
| 2012/0159469 | A1* | 6/2012 | Laor | G06F 9/4555 717/173 |
| 2014/0033194 | A1* | 1/2014 | Natchadalingam | G06F 8/65 717/173 |
| 2014/0123122 | A1* | 5/2014 | Dhanyamraju | G06F 8/65 717/168 |
| 2014/0189677 | A1* | 7/2014 | Curzi | G06F 8/65 717/171 |
| 2014/0223423 | A1* | 8/2014 | Alsina | G06F 8/65 717/173 |
| 2014/0325514 | A1* | 10/2014 | Benedetti | G06F 8/65 718/1 |
| 2014/0359617 | A1* | 12/2014 | Fontignie | G06F 8/65 718/1 |
| 2015/0254072 | A1* | 9/2015 | Wojcik | G06F 8/71 710/13 |
| 2016/0170734 | A1* | 6/2016 | Kruempelmann | G06F 8/65 717/172 |
| 2016/0378456 | A1* | 12/2016 | Chai | G06F 8/65 717/169 |

* cited by examiner

| SL ↗202 | GOS ↗204 | Tools Image Path ↗206 | VM Name ↗208 | VMDK ↗210 | Offline Tools Install or Upgrade Enabled? ↗212 | VM Tools Version ↗214 | HotAdd/VDDK ↗216 | Tools Latest? ↗218 |
|---|---|---|---|---|---|---|---|---|
| 1 | W2K8 | /images/i1.iso | VM1 | VMDK1 | Yes | 3.5.4 | VDDK | Yes |
| 2 | RHEL6 | /images/i2.iso | VM2 | VMDK5 | No | 5.4 | VDDK | No |
| 3 | Ubuntu7 | /images/i3.iso | VM3 | VMDK6 | Yes | No tools | HotAdd | No |
| 4 | Win7 | /images/i4.iso | VM4 | VMDK9 | Yes | 4.5 | HotAdd | No |

OFFLINE TOOLS INSTALLATION FOR VIRTUAL MACHINES

RELATED APPLICATIONS

Benefit is claimed under 35 U.S.C. 119(a)-(d) to Foreign application Serial No. 6102/CHE/2015 tiled in India entitled "OFFLINE TOOLS INSTALLATION FOR VIRTUAL MACHINES", filed on Nov. 12, 2015, by VMware, Inc., which is herein incorporated in its entirety by reference for all purposes.

BACKGROUND

In a cloud, datacenter, or virtual desktop infrastructure environment, numerous virtual machines (VMs) may be in use and new VMs are provisioned at regular intervals. The new VMs are provisioned with various guest operating system (OS) images and versions of software. In addition, existing VMs are often in need of regular software updates and upgrades. It is often a large and complicated task to install and configure various virtual machine tools in the guest OSs according to the guest OSs' native supported drivers.

Currently, software for the VMs is installed or upgraded after powering on the VM, while the VM is running. However, this process can require a number of minutes to complete, and therefore a user must wait for the software upgrades to occur. In addition, software installations or upgrades often require a reboot of the VM, which increases the wait time before the VM can be used.

SUMMARY

One or more embodiments provide techniques for installing and configuring tools on virtual machines. A method for managing tools on a virtual machine includes provisioning a virtual machine. The method also includes, before powering on the virtual machine, collecting a list of one or more tools on the virtual machine, and a version associated with each of the one or more tools. The method also includes determining if one or more new tools should be installed on the virtual machine. Responsive to determining if one or more new tools should be installed, the method includes retrieving a tool image for each new tool to be installed. The method further includes installing the one or more new tools on a virtual disk file of the provisioned virtual machine using the tool images.

According to another embodiment, a non-transitory computer-readable storage medium contains a program which, when executed by one or more processors, performs operations for installing and configuring tools, where the operations including provisioning a virtual machine. The operations also include before powering on the Virtual machine, collecting a list of one or more tools on the virtual machine, and a version associated with each of the one or more tools. The operations also include determining if one or more new tools should be installed on the virtual machine. Responsive to determining if one or more new tools should be installed, the operations include retrieving a tool image for each new tool to be installed. The operations further include installing the one or more new tools on a virtual disk file of the provisioned virtual machine using the tool images.

According to yet another embodiment, a system includes a processor and a memory, wherein the memory includes a program executable in the processor to perform operations for scheduling computing resources. The operations include provisioning a virtual machine. The operations also include before powering on the virtual machine, collecting a list of one or more tools on the virtual machine, and a version associated with each of the one or more tools. The operations also include determining if one or more new tools should be installed on the virtual machine. Responsive to determining if one or more new tools should be installed, the operations include retrieving a tool image for each new tool to be installed. The operations further include installing the one or more new tools on a virtual disk file of the provisioned virtual machine using the tool images.

BRIEF DESCRIPTION OF THE DRAWINGS

FIG. 2 illustrates an example tool install catalog according to an embodiment.

DETAILED DESCRIPTION

Embodiments described herein provide a method of installing and configuring tools on a virtual machine. After a VM is provisioned but before it is powered on, a VM tools manager scans and collects information about the tools installed on the VM, including the version of the tools. Tools are then installed and/or upgraded before the VM is powered on. Embodiments herein provide multiple options to install or upgrade the tools, as described in further detail below.

Figure 1:
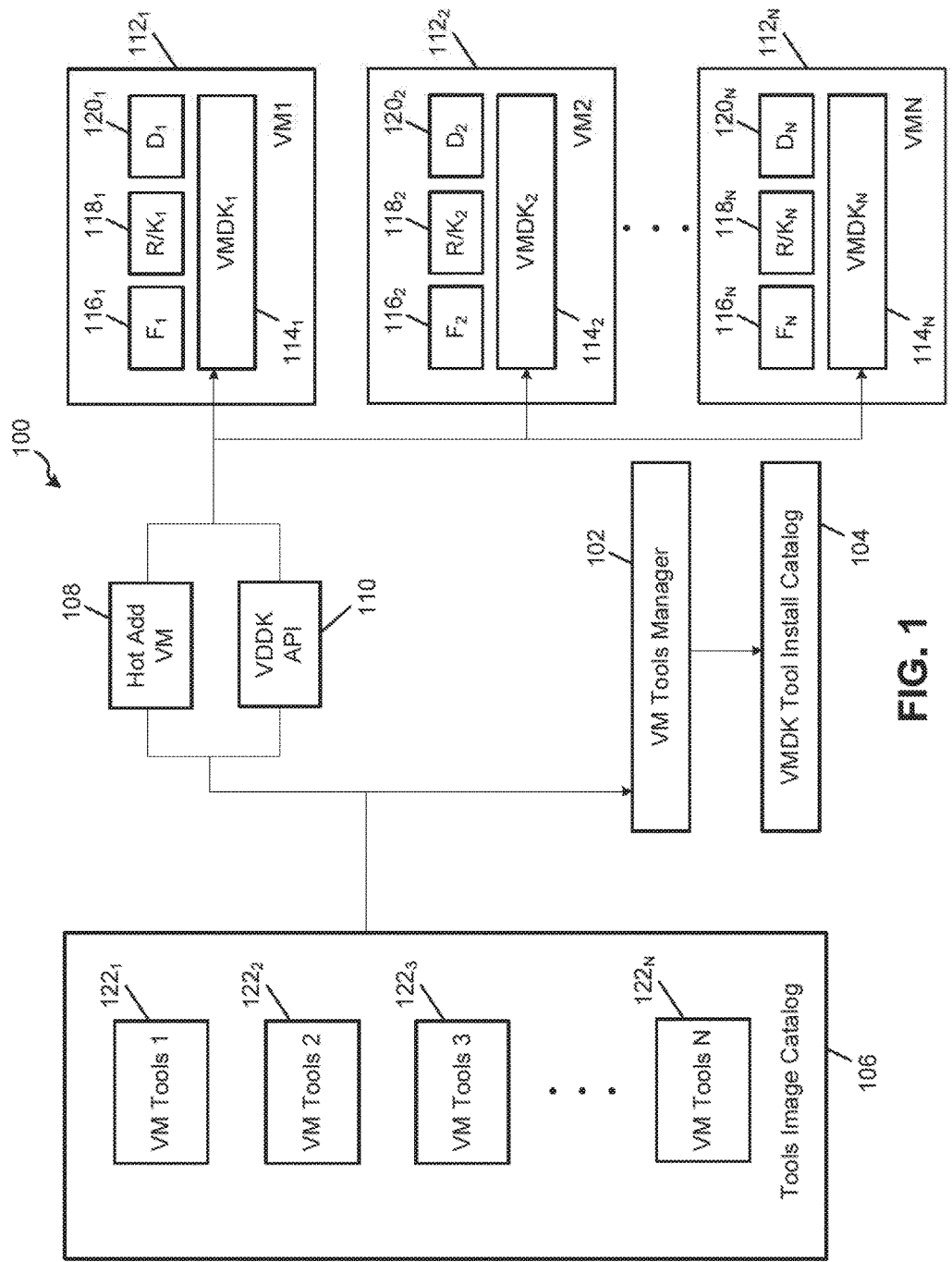
FIG. 1 is a block diagram that illustrates a computing system in accordance with one embodiment.

FIG. 1 is a block diagram that illustrates a computing system 100 with which one or more embodiments of the present disclosure may be utilized. A VM tools manager 102 may be deployed in a cloud environment or in a datacenter. One or more virtual machines ($112_1$, $112_2$, . . . $112_N$) have been provisioned, each with an associated virtual machine disk (VMDK) 114, as shown. The VMs 112 may each include files 116, a registry/kernel 118, and drivers 120. As noted above, files 116, registry/kernel 118, and drivers 120 are periodically updated due to software upgrades associated with the VMs 112.

Computing system 100 also comprises a VMDK tool install catalog 104. Tool install catalog 104 stores information about the software tools installed on each VM 112, as described in further detail below. Tool install catalog 104 may store information about the guest OS for each VM 112, along with information about one or more tools installed on each VM 112. VM tools manager 102 is configured to scan through each VM 112 and determine the guest OS and tools information for each VM 112, and then populate that information into tool install catalog 104. This information may include the version number of any tools installed on each of the VMs 112. VM tools manager 102 utilizes the information stored in tool install catalog 104 to determine if updated tools are available, and then updates the tools on a VM 112 when the VM 112 is provisioned. VM tools manager 102 takes control of a VM 112 to install or upgrade tools when the VM 112 is in a powered off state, as described in further detail below.

VM tools image catalog 106 is also maintained in computing system 100. VM tools image catalog 106 maintains the updated versions of various tools for the different guest OSs (illustrated as 122₁, 122₂, . . . 122_N). These updated versions are used to update the software for each of the various VMs 112 when a new VM 112 is provisioned, if an update is necessary. When a new VM 112 is provisioned, VM tools manager 102 can retrieve the appropriate toots image 122 from tools image catalog 106 for upgrading the software on the newly-provisioned VM 112, or for installing new software on the newly-provisioned VM 112, or both. The tools image may be a disk image or an ISO file.

To reduce the delays associated with upgrading various tools, embodiments described herein install and/or upgrade VM tools when the VM has been provisioned, even before the VM is powered on. Upgrading of the VM tools is achieved, in some embodiments, by updating the drivers 120, updating any registry/kernel 118 files, and/or copying any other required files to the appropriate directories. Two processes for upgrading the VMs (hot add 108 or virtual disk manager utility (VDDK) API 110) will be described in thither detail below.

FIG. 2 illustrates an example tool install catalog 104. Any appropriate table or database may be used for tool install catalog 104. FIG. 2 illustrates one example embodiment; in other embodiments, other columns may be included to store other information about the tools. Column 202 provides an index for each VM in the catalog. Column 204 comprises the guest OS for each VM in the catalog. Example guest OSs 204 shown in tool install catalog 104 include Windows Server® 2008, Red Hat® Enterprise Linux®, Ubuntu®, and Windows® 7.

Column 206 includes the tools image path for each VM. Column 208 provides the VM name, while column 210 provides the VMDK name. Column 212 indicates whether offline tools upgrade is enabled. If offline tools upgrade is enabled, embodiments of the present invention can upgrade the VM before the VM is powered on.

Column 214 includes the VM tools version for each VM. VM tools manager 102 is configured to scan the various VMs and update tool install catalog 104 with the current VM tools version. If one or more tools are not installed on a VM, this can also be noted in the catalog, and the tools may installed utilizing the embodiments herein, as described in further detail below. Column 216 indicates which option the tools manager 102 can employ to upgrade the tools version for each of the VMs or to install new tools. Two options are illustrated in this example: hot add or VDDK. Finally, column 218 identifies whether the tools version installed on the VM, if any, is the latest tools version. If the tools version is not the latest, embodiments of the present invention can upgrade the tools when the VM is provisioned.

Hot add is a feature where devices can be added while a VM is running. To perform a hot add upgrade, VM tools manager 102 can use a hot add operation on a powered-on VM to add a VMDK that contains the updated VM tools to the VM 112. Therefore, an additional VM is needed to perform the hot add operation. After the VMDK is hot added, required operations can be performed, such as copying any required files, replacing driver files, modifying registry files, and/or updating OS or kernel files on the virtual disk file. A hot add operation is described in further detail below with respect to FIG. 4.

To upgrade tools using the VDDK API, the VM tools manager 102 mounts tools images from the VM tools image catalog 106 according to the VMDK data in the tool install catalog 104, and then deploys and/or upgrades the latest version of tools in those VMDKs. A VDDK API, in some embodiments, is configured by backup software to access VMDK content directly. If the guest OS does not hold the VM tools, it can self-detect the suitable tools image and deploy them. The guest OS can also maintain the tools image in the tools image catalog 105 for future reference by VM tools manager 102. The corresponding tools image can be found by retrieving the version from properties of the VM.

Figure 3:
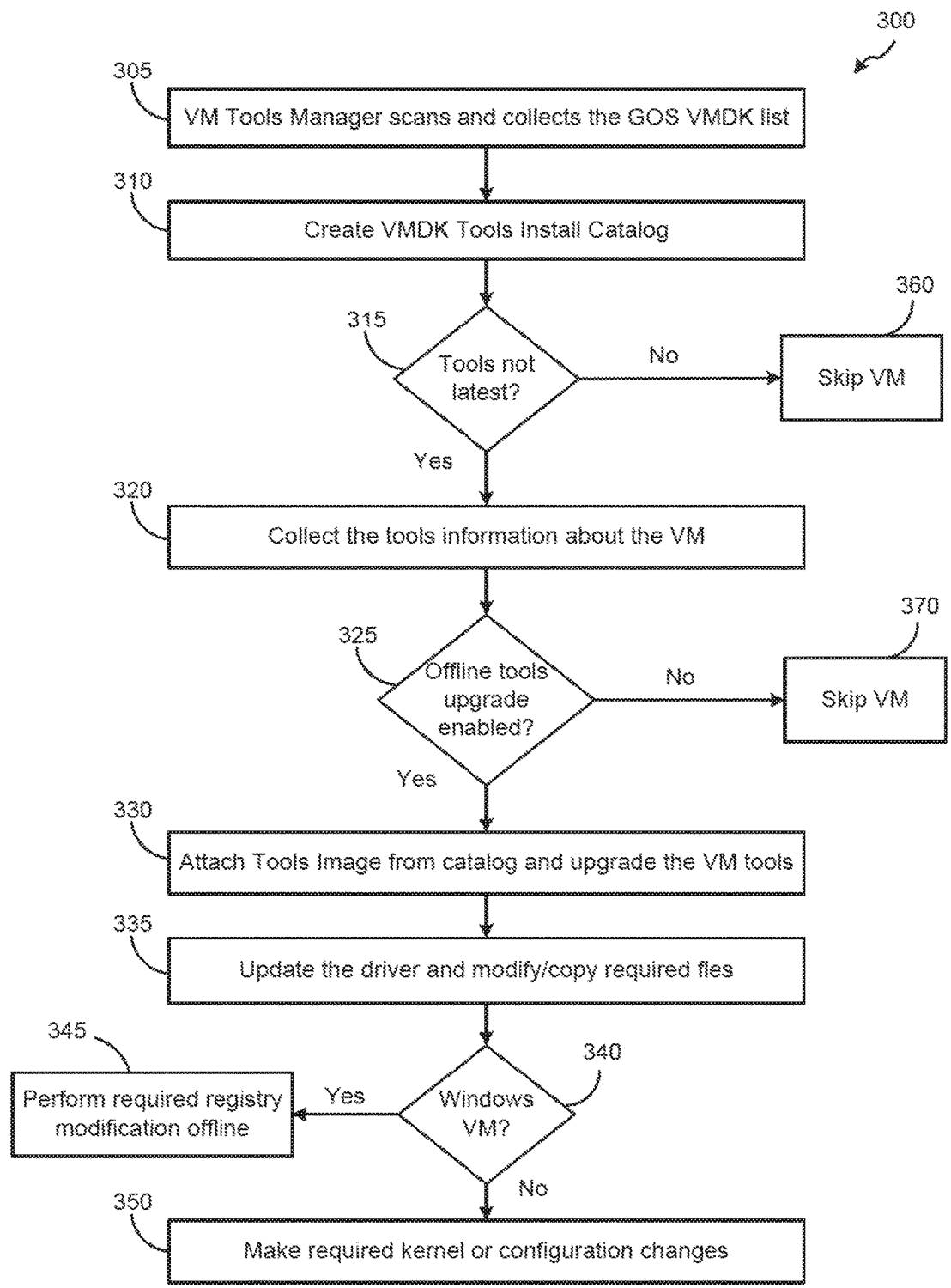
FIG. 3 is a flow diagram that illustrates a method of upgrading tools on a virtual machine.

FIG. 3 is a flow diagram that illustrates a method 300 of upgrading tools on a virtual machine. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 3.

As shown, a method 300 begins at step 305 where a VM tools manager scans VMDKs and collects information about the installed guest OSs and any tools installed on the VMDKs. A VM tools manager may be employed in a cloud environment or in a datacenter in some embodiments.

At step 310, the VM tools manager creates or updates a VMDK tools install catalog. The tools install catalog may store information about the guest OS for each VMDK, along with information about one or more tools installed on each VMDK. This information may also include the version number of any tools installed.

At step 315, the method determines whether the tools for each VMDK are not the latest version of the tools (i.e., if the tools need to be updated). If the tools are the latest, the method proceeds to step 360 and that VM can be skipped for tool upgrade or installation. If the tools are not the latest, the method proceeds to step 320.

At step 320, VM tools manager 102 collects tools information about each VM. This information may be stored in the tools install catalog, as described above with respect to FIG. 2. At step 325, the method determines whether offline tools upgrade is enabled. If not, method proceeds to step 370 and that VM can be skipped for tool upgrade or installation. If offline tools upgrade is enabled, the method proceeds to step 330.

At step 330, the VM tools manager 102 attaches the appropriate tools images from the tools image catalog. These images include the images for the tools that need to be installed or upgraded for the provisioned VM. The tools are upgraded using the appropriate procedure, either VDDK or hot add.

At step 335, drivers are updated along with any other necessary file updates. The VDDK or hot add procedures may also be used in this step. Although not shown in FIG. 3, the VM tools install catalog could also be updated at this step or at a later step. The VM tools install catalog could be updated to include the new VM tools version, and/or updated to note that the tools are now the latest version.

At step 340, the method determines whether this is a Windows® VM. If it is, required registry modification can be performed offline, as illustrated in step 345. If it is not a Windows® VM, the method proceeds to step 350 to make required kernel or configuration changes. After the method finishes, the tools are upgraded to the latest version and the VM can be powered on.

Figure 4:
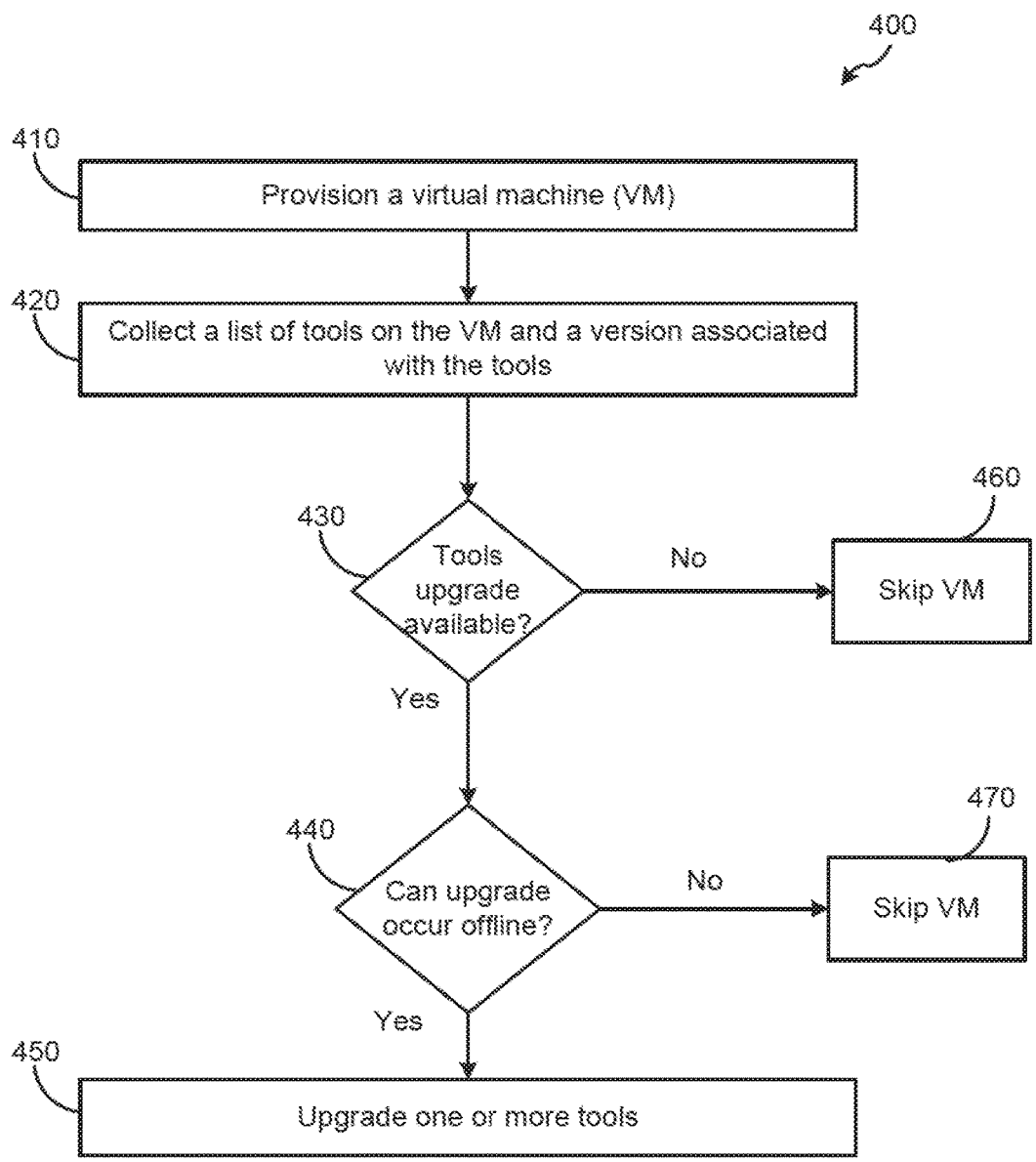
FIG. 4 is another flow diagram that illustrates a method of upgrading tools on a virtual machine.

FIG. 4 is a flow diagram that illustrates a method 400 of upgrading tools on a virtual machine. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 4.

As shown, a method 400 begins at step 410 where a virtual machine is provisioned. Before powering on the virtual machine, the method proceeds to step 420, where a tools manager, such as VM tools manager 102, collects a list of one or more tools on the virtual machine. A version associated with each of the one or more tools is also collected. This information may be stored in a tools install catalog. The tools install catalog may store other information about the VM, such as whether an offline upgrade is available. An example tool install catalog is illustrated above in FIG. 2.

At step 430, the tools manager determines if an upgrade is available for any of the one or more tools. The version of the tools associated with the VMDK may be compared to the latest version of the tools stored in a tools image catalog to see if an upgade is available. If an upgrade is not available, the method proceeds to step 460 and skips this VM. If an upgrade is available, the method continues to step 440.

At step 440, if an upgrade is available, the method determines if the upgrade can occur offline. If the upgrade cannot occur offline, the method proceeds to step 470 and skips this VM. If the upgrade can occur offline, the method proceeds to step 450. The method may determine if the upgrade can occur of by checking a tools install catalog. The tools install catalog may contain a status indicator for each VM that signifies whether the upgrade can occur offline.

At step 450, if the upgrade can occur offline, one or more tools are upgraded by an appropriate procedure. In some embodiments, drivers and other files are modified or copied. Registry and kernel modifications may also be performed. Any suitable method may be used to perform the upgrades, such as a hot add operation or VDDK API, as described above.

Figure 5:
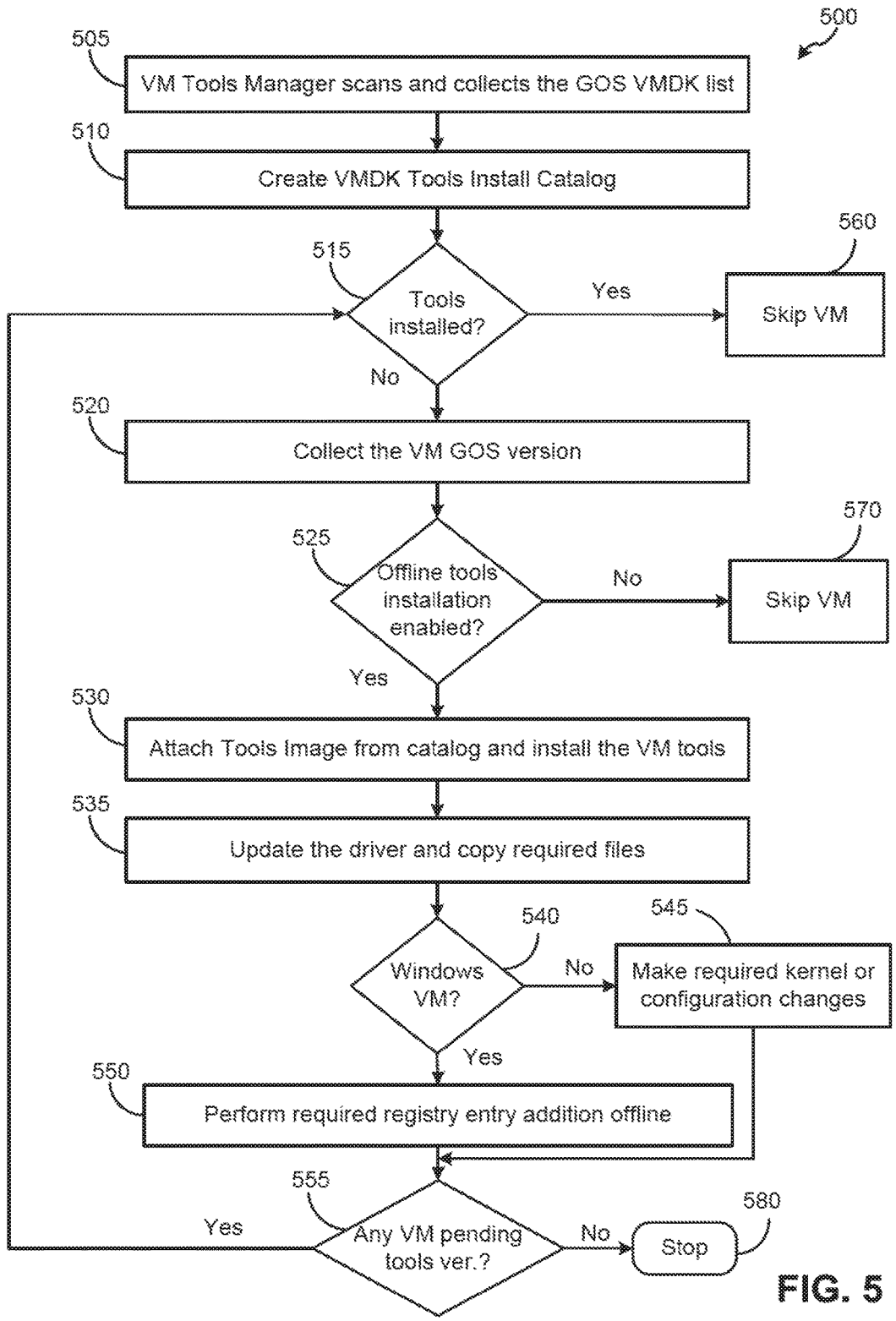
FIG. 5 is a flow diagram that illustrates a method of installing tools on a virtual machine.

FIG. 5 is a flow diagram that illustrates a method 500 of installing tools on a virtual machine. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 5.

As shown, a method 500 begins at step 505 where a VM tools manager scans VMDKs and collects information about the installed guest OSs and any tools installed on the VMDKs. A VM tools manager may be employed in a cloud environment or in a datacenter in some embodiments.

At step 510, the VM tools manager creates or updates a VMDK tools install catalog. The tools install catalog may store information about the guest OS for each VMDK, along with information about one or more tools installed on each VMDK. This information may also include the version number of any tools installed.

At step 515, the method determines whether appropriate or desired tools are installed on each VMDK. If the proper tools are installed, the method proceeds to step 560 and that VM can be skipped for tool installation. If the proper tools are not installed, the method proceeds to step 520.

At step 520, VM tools manager 102 collects guest OS information about each VM. This information may be stored in the tools install catalog, as described above with respect to FIG. 2. At step 525, the method determines whether offline tools installation is enabled. If not, method proceeds to step 570 and that VM can be skipped for tool installation. If offline tools upgrade is enabled, the method proceeds to step 530.

At step 530, the tools images for any tools that need to be installed on the VM are retrieved from the catalog and installed on the VM. The location of the driver files, configuration files, and registry/kernel entries can be generated by the VM tools manager 102. The tools are upgraded using the appropriate procedure, either VDDK or hot add. If a default location does not have enough free space to install the tools, a directory with enough required free space should be located.

At step 535, drivers are updated along with copying any required files. The VDDK or hot add procedures may also be used in this step. Although not shown in FIG. 5, the VM tools install catalog could also be updated at this step or at a later step. The VM tools install catalog could be updated to include the new VM tools that were installed, and also updated to note that the tools are the latest version.

At step 540, the method determines whether this is a Windows® VM. If it is, required registry additions can be performed offline, as illustrated in step 550. If it is not a Windows® VM, the method proceeds to step 545 to make required kernel or configuration changes. After making required kernel or configuration changes, the method proceeds to step 555. A check can also be made to determine if an appropriate configuration file is present to detect whether the tools are installed.

The method proceeds to step 555 from either step 545 or step 550. In step 555, the VM tools manager determines if any other VM is pending tools verification. If not, the method stops at step 580. If there is a VM pending tools verification, the method returns to step 515 to install tools on another VM. After the method finishes, the tools are upgraded to latest version and the VM can be powered on.

Figure 6:
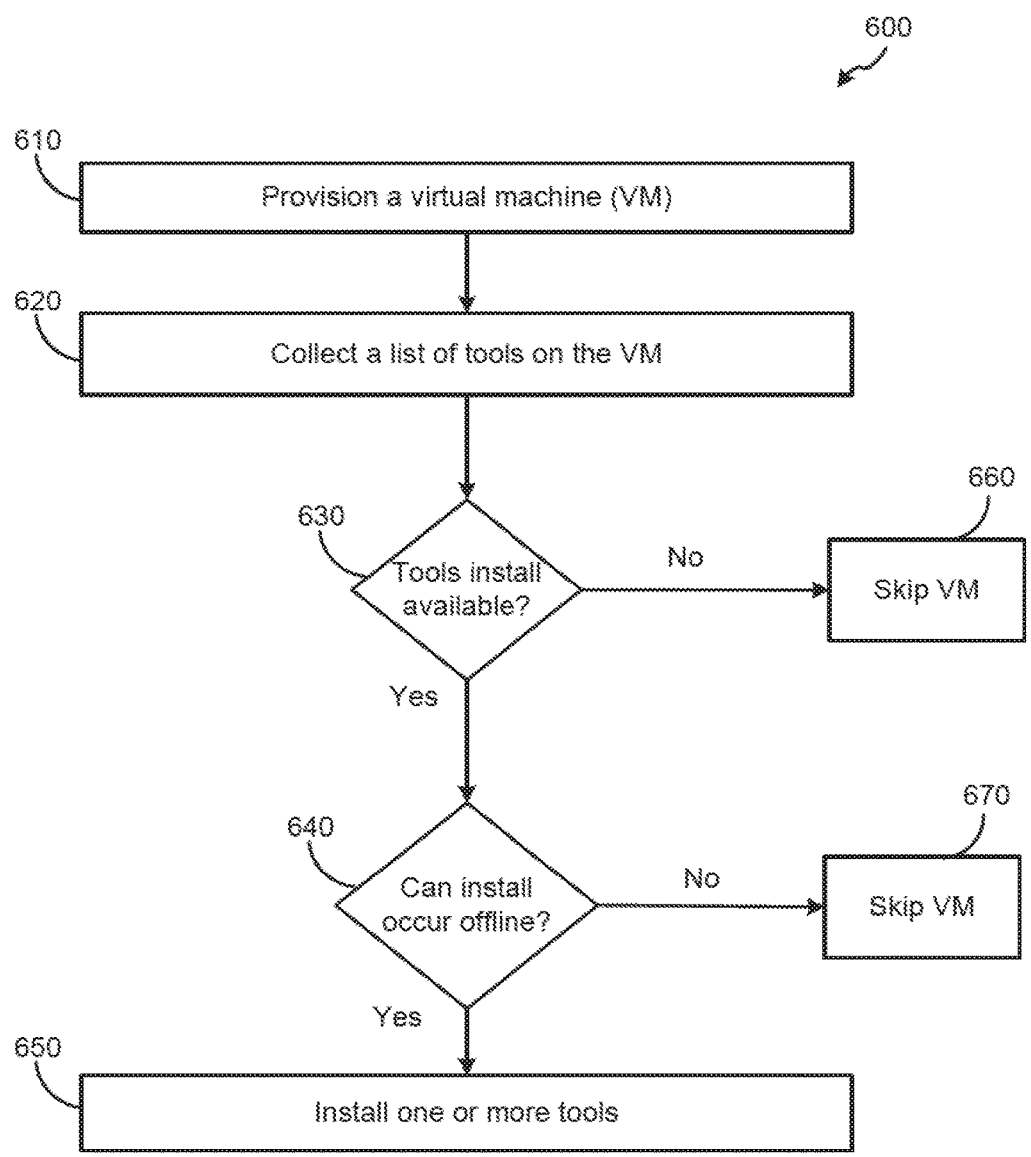
FIG. 6 is another flow diagram that illustrates a method of installing too s on a virtual machine.

FIG. 6 is a flow diagram that illustrates a method 600 of installing tools on a virtual machine. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 6.

As shown, a method 600 begins at step 610 where a virtual machine is provisioned. Before powering on the virtual machine, the method proceeds to step 620, where a tools manager, such as VM tools manager 102, collects a list of one or more tools on the virtual machine. A version associated with each of the one or more tools may also be collected. This information may be stored in a tools install catalog. The tools install catalog may store other information about the VM, such as whether an offline upgrade is available. An example tool install catalog is illustrated above in FIG. 2.

At step 630, the tools manager determines if new tools are available to be installed on the VM. The list of tools associated with the VMDK may be compared to a desired list of tools stored to see if a new tool is available to be installed. If a new tool installation is not available, the method proceeds to step 660 and skips this VM. If a new tool is available, the method continues to step 640.

At step 640, if a new install is available, the method determines if the installation can occur offline. If the installation cannot occur offline, the method proceeds to step 670 and skips this VM. If the installation can occur offline, the method proceeds to step 650. The method may determine if the installation can occur offline by checking a tools install catalog. The tools install catalog may contain a status indicator for each VM that signifies whether the installation can occur offline.

At step 650, if the installation can occur offline, one or more tools are installed by an appropriate procedure. Drivers and other required files are copied top the VMDK. Registry and kernel modifications are also performed. Any suitable method may be used to perform the tools installation, such as a hot add operation or VDDK API, as described above.

Embodiments described herein provide a method of installing and configuring tools on a virtual machine. These embodiments provide seamless tools installation or upgrades after provisioning a VM but before the VM is powered on. Performing these processes after the VM is provisioned but before power-on reduces the wait time for a user to use the VM. These processes also can increase VM readiness by updating the tools before power-on and avoiding VM reboots required by some upgrades or installations.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations, are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be hunted to details when herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for managing tools on a virtual machine, comprising:
provisioning a virtual machine; and
before powering on the virtual machine:
collecting a list of one or more tools on the virtual machine, and a version associated with each of the one or more tools;
determining if one or more new tools that are not currently installed on the virtual machine should be installed on the virtual machine;
responsive to determining that the one or more new tools that are not currently installed on the virtual machine should be installed, checking a tool catalog to determine whether offline tools installation is enabled for the virtual machine;
responsive to determining that the one or more new tools should be installed and that offline tools installation is enabled for the virtual machine, retrieving a tool image for the one or more new tools based on a tool image path in the tool catalog;
responsive to determining that the one or more new tools should be installed and that offline tools installation is enabled for the virtual machine, installing the one or more new tools that are not currently installed on the virtual machine on a virtual disk file of the provisioned virtual machine using the tool image;
after installing the one or more new tools, determining if the virtual machine is a particular type of virtual machines;
responsive to determining that the virtual machine is the particular type of virtual machines, performing a registry modification of the virtual machine offline;
responsive to determining that the virtual machine is not the particular type of virtual machines, upgrading a kernel associated with a guest operating system; and
responsive to determining that the one or more new tools should be installed and that offline tools installation is not enabled for the virtual machine, skipping installing the one or more new tools.

2. The method of claim 1, further comprising:
after installing the one or more new tools, updating the list of one or more tools and the version associated with the one or more tools.

3. The method of claim 1, wherein installing the one or more new tools comprises:
installing the one or more new tools utilizing the tool image from the tool catalog.

4. The method of claim 1, wherein installing the one or more new tools comprises selecting the tool image from the tool catalog according to virtual machine disk data associated with the virtual machine, and mounting the tool image on a virtual machine disk associated with the provisioned virtual machine before powering on the virtual machine.

5. The method of claim 1, wherein installing the one or more new tools comprises using a hot add procedure to add a virtual machine disk to the virtual machine.

6. The method of claim 1, wherein collecting a list of one or more tools on the virtual machine further comprises scanning the guest operating system.

7. The method of claim 1, wherein installing the one or more new tools further comprises installing driver files associated with the one or more new tools before powering on the virtual machine.

8. A non-transitory computer-readable storage medium containing a program which, when executed by one or more processors, performs operations for scheduling computing resources, the operations comprising:
provisioning a virtual machine; and
before powering on the virtual machine:
collecting a list of one or more tools on the virtual machine, and a version associated with each of the one or more tools;
determining if one or more new tools that are not currently installed on the virtual machine should be installed on the virtual machine;
responsive to determining that the one or more new tools that are not currently installed on the virtual machine should be installed, checking a tool catalog to determine whether offline tools installation is enabled for the virtual machine;
responsive to determining that the one or more new tools should be installed and that offline tools installation is enabled for the virtual machine, retrieving a tool image for the one or more new tools based on a tool image path in the tool catalog;
responsive to determining that the one or more new tools should be installed and that offline tools installation is enabled for the virtual machine, installing the one or more new tools that are not currently installed on the virtual machine on a virtual disk file of the provisioned virtual machine using the tool image;
after installing the one or more new tools, determining if the virtual machine is a particular type of virtual machines;
responsive to determining that the virtual machine is the particular type of virtual machines, performing a registry modification of the virtual machine offline;
responsive to determining that the virtual machine is not the particular type of virtual machines, upgrading a kernel associated with a guest operating system; and
responsive to determining that the one or more new tools should be installed and that offline tools installation is not enabled for the virtual machine, skipping installing the one or more new tools.

9. The non-transitory computer-readable storage medium of claim 8, wherein the operations further comprise:
after installing the one or more new tools, updating the list of one or more tools and the version associated with the one or more tools.

10. The non-transitory computer-readable storage medium of claim 8, wherein installing the one or more new tools comprises:
installing the one or more new tools utilizing the tool image from the tool catalog.

11. The non-transitory computer-readable storage medium of claim 8, wherein installing the one or more new tools comprises selecting the tool image from the tool catalog according to virtual machine disk data associated with the virtual machine, and mounting the tool image on a virtual machine disk associated with the provisioned virtual machine before powering on the virtual machine.

12. The non-transitory computer-readable storage medium of claim 8, wherein installing the one or more new tools comprises using a hot add procedure to add a virtual machine disk to the virtual machine.

13. The non-transitory computer-readable storage medium of claim 8, wherein collecting a list of one or more tools on the virtual machine further comprises scanning the guest operating system.

14. A system, comprising:
a processor; and
a memory, wherein the memory includes a program executable in the processor to perform operations for scheduling computing resources, the operations comprising:
provisioning a virtual machine; and
before powering on the virtual machine:
    collecting a list of one or more tools on the virtual machine, and a version associated with each of the one or more tools;
    determining if one or more new tools that are not currently installed on the virtual machine should be installed on the virtual machine;
    responsive to determining that the one or more new tools that are not currently installed on the virtual machine should be installed, checking a tool catalog to determine whether offline tools installation is enabled for the virtual machine;
    responsive to determining that the one or more new tools should be installed and that offline tools installation is enabled for the virtual machine, retrieving a tool image for the one or more new tools based on a tool image path in the tool catalog;
    responsive to determining that the one or more new tools should be installed and that offline tools installation is enabled for the virtual machine, installing the one or more new tools that are not currently installed on the virtual machine on a virtual disk file of the provisioned virtual machine using the tool image;
    after installing the one or more new tools, determining if the virtual machine is a particular type of virtual machines;
    responsive to determining that the virtual machine is the particular type of virtual machines, performing a registry modification of the virtual machine offline;
    responsive to determining that the virtual machine is not the particular type of virtual machines, upgrading a kernel associated with a guest operating system; and
    responsive to determining that the one or more new tools should be installed and that offline tools installation is not enabled for the virtual machine, skipping installing the one or more new tools.

15. The system of claim 14, wherein the operations further comprise:
after installing the one or more new tools, updating the list of one or more tools and the version associated with the one or more tools.

16. The system of claim 14, wherein installing the one or more new tools comprises:
installing the one or more new tools utilizing the tool image from the tool catalog.

17. The system of claim 14, wherein installing the one or more new tools comprises using a hot add procedure to add a virtual machine disk to the virtual machine.

18. The system of claim 14, wherein collecting a list of one or more tools on the virtual machine further comprises scanning the guest operating system.

* * * * *